(12) United States Patent
Hata et al.

(10) Patent No.: US 6,517,254 B1
(45) Date of Patent: Feb. 11, 2003

(54) COLLAR MEMBER AND FERRULE

(75) Inventors: Yuukou Hata, Koto-ku (JP); Tarou Ueno, Koto-ku (JP); Hiroshi Fujita, Koto-ku (JP); Setsuo Shoji, Koto-ku (JP); Ryuji Takahashi, Koto-ku (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/776,326

(22) Filed: Feb. 2, 2001

(30) Foreign Application Priority Data

Feb. 4, 2000 (JP) ........................................ 2000-027729
Feb. 2, 2001 (JP) ........................................ 2001-026402

(51) Int. Cl.⁷ ................................................. G02B 6/38
(52) U.S. Cl. ....................................................... 385/69
(58) Field of Search ............................. 385/55, 60, 66, 385/69, 70, 77, 78, 80, 84, 85

(56) References Cited

U.S. PATENT DOCUMENTS 5,241,613 A * 8/1993 Li et al. ........................ 385/29
5,515,466 A * 5/1996 Lee ............................. 385/139
5,862,282 A * 1/1999 Matsuura et al. ............. 385/60

* cited by examiner

Primary Examiner—Tulsidas Patel
(74) Attorney, Agent, or Firm—Adams & Wilks

(57) ABSTRACT

A collar member and a ferrule with improved dimensional precision, a simplified manufacturing process, and reduced cost. The collar member is provided at the rear end of a ferrule tubular body that has an optical fiber insertion hole to which an optical fiber is inserted. The collar member has a metal pipe member with an inner diameter sufficient to slidably accommodate the ferrule tubular body, a collar portion integrally molded of plastic on the outer periphery of the pipe member, the collar portion having a key groove on its outer peripheral surface for positioning with respect to an optical connector housing, a coated fiber holding portion integrally molded of plastic in the rear half of the pipe member with an inner diameter smaller than that of the pipe member, for receiving therein a coated optical fiber.

31 Claims, 20 Drawing Sheets

FIG. 2A
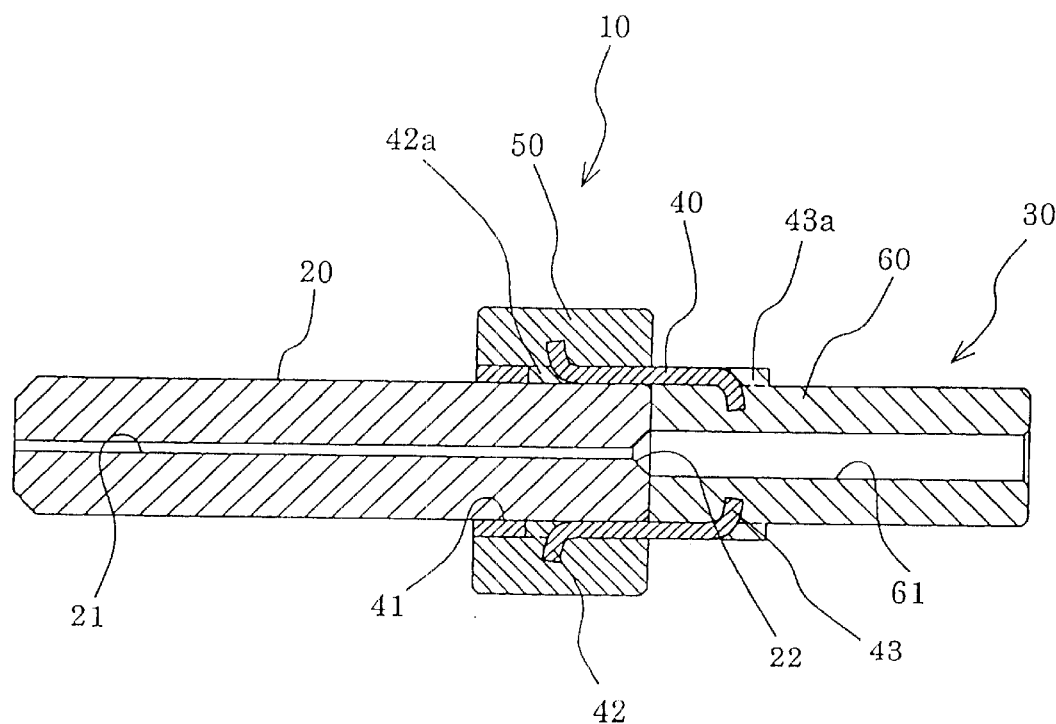
FIG. 2B
FIG. 2C
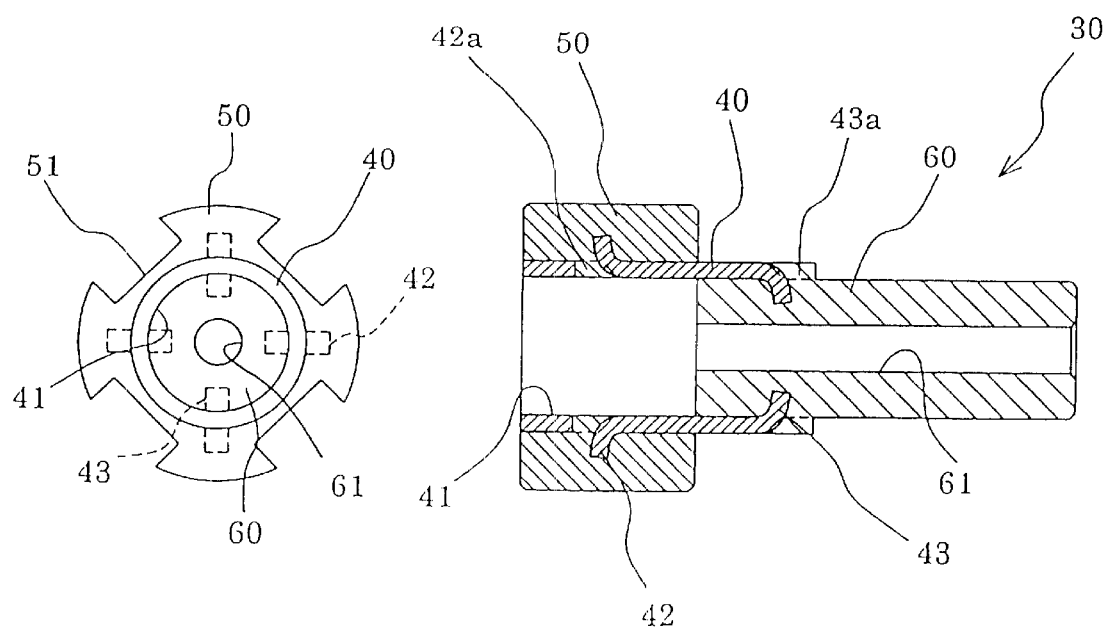

FIG. 3A
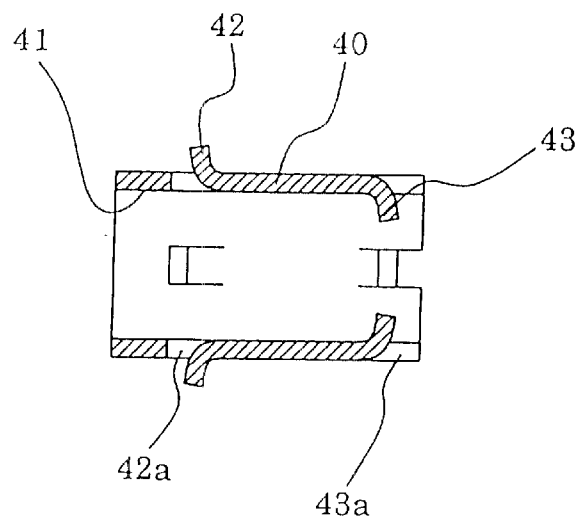
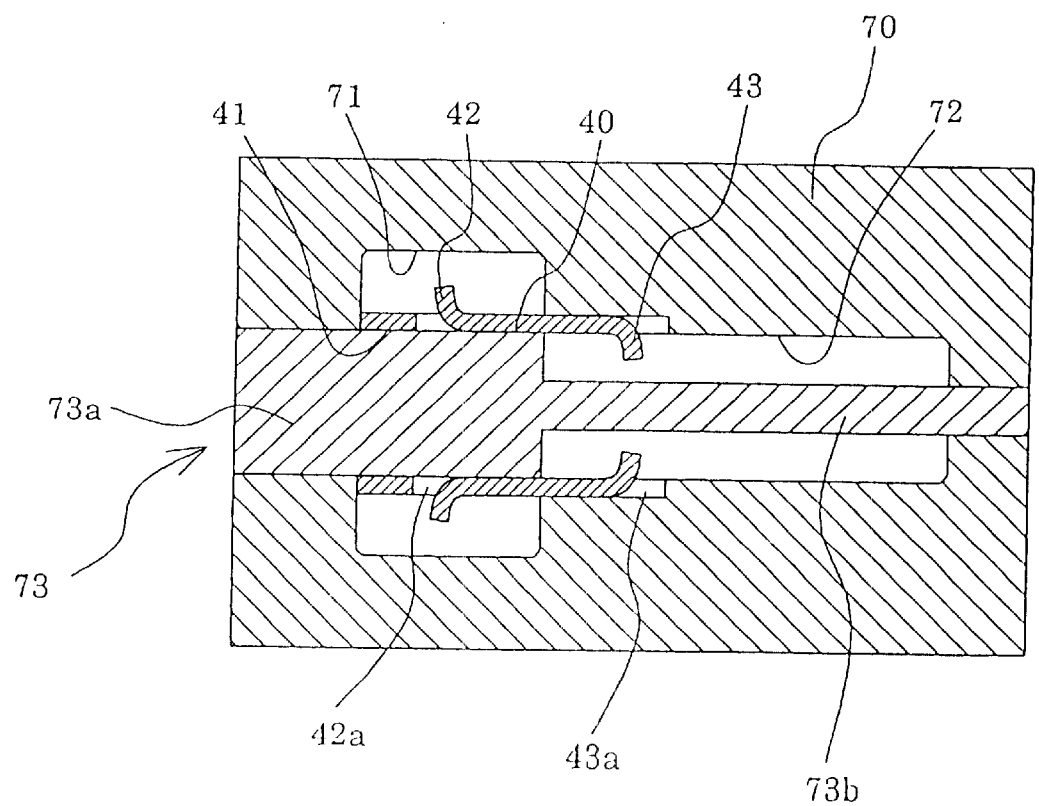
FIG. 3B

COLLAR MEMBER AND FERRULE

FIELD OF THE INVENTION

The present invention relates a ferrule that is a part of a plug constituting an optical connector for optical connection, particularly to a collar member that constitutes the ferrule.

BACKGROUND DISCUSSION

Optical connectors currently used in communication provide optical connection by inserting and fixing an optical fiber in a ferrule processed with high precision to have accurate inner diameter and outer diameter, polishing the optical fiber facet to be connected into a convex spherical shape, and physically contacting the optical fiber with another optical fiber.

The ferrule into which an optical fiber is inserted to be held is usually composed of a ferrule tubular body and a collar member. The ferrule tubular body is formed from hard ceramic such as zirconia or from glass, and has an optical fiber insertion hole. The collar member is formed at the rear end of the ferrule tubular body from a metal such as stainless steel, and has a hollow hole communicated with the rear end of the optical fiber insertion hole. An optical fiber, namely, a coated optical fiber with its tip removed of coating, is inserted in the optical fiber insertion hole formed inside the ferrule tubular body, and the inserted optical fiber is bonded to the ferrule with an adhesive or the like.

However, the collar member is formed by cutting a metal, and bite wear caused during the cutting results in fluctuation in inner diameter of the hollow hole to be fitted with the ferrule. tubular body. When the collar member whose hollow hole has fluctuating inner diameter is fitted to the rear end of the ferrule tubular body, the pressure applied to the ferrule tubular body also fluctuates to cause error. To form the entire collar member from a metal has another problem of high manufacturing cost.

The present invention has been made in view of the above, and an object of the present invention is therefore to provide a collar member and a ferrule with improved dimensional precision, simplified processing steps, and reduced cost.

SUMMARY OF THE INVENTION

A first aspect of the present invention to attain the above object is a collar member provided at the rear end of a ferrule tubular body that has an optical fiber insertion hole to which an optical fiber is inserted, characterized by comprising:
- a metal pipe member with an inner diameter that allows the pipe member to accommodate the ferrule tubular body;
- a collar portion integrally molded of plastic on the outer periphery of the pipe member, the collar portion having on its outer peripheral surface a key groove for positioning with respect to an optical connector housing;
- a coated fiber holding portion integrally molded of plastic in the rear half of the pipe member to have an inner diameter smaller than the inner diameter of the pipe member, the coated fiber holding portion receiving therein a coated optical fiber that is obtained by coating the outer periphery of an optical fiber.

A second aspect of the present invention is a collar member of the first aspect of the invention, characterized in that the collar portion and the coated fiber holding portion are integrally formed in a one-piece construction.

A third aspect of the present invention is a collar member of the first or second aspect of the invention, characterized in that the collar portion and the coated fiber holding portion are engaged with the pipe member so that they are restricted in their axial and rotational movement.

A fourth aspect of the present invention is a collar member of the first aspect of the invention, characterized in that the pipe member has projections projecting therefrom toward the axial direction thereof on its outer peripheral surface in at least one location where the collar portion is formed, or on its inner peripheral surface where the coated fiber holding portion is formed, so as to engage the collar potion or the coated fiber holding portion to restrict axial and rotational movement thereof.

A fifth aspect of the present invention is a collar member of the first aspect of the invention, characterized in that the pipe member has on its outer peripheral surface a plurality of grooves formed along the circumference thereof, so as to engage the collar potion or the coated fiber holding portion to restrict axial and rotational movement thereof.

A sixth aspect of the present invention is a collar member of the first aspect of the invention, characterized in that the pipe member has on its outer peripheral surface a helical groove.

A seventh aspect of the present invention is a collar member of the first aspect of the invention, characterized in that the pipe member has an engagement hole opened on its outer peripheral surface, so as to engage the collar potion or the coated fiber holding portion to restrict axial and rotational movement thereof.

An eighth aspect of the present invention is a collar member of the first aspect of the invention, characterized by further comprising a planar portion on the collar portion side end of the pipe member spreading in the radial direction, the planar portion having an engagement hole to be engaged with the outer peripheral surface of the collar portion to restrict axial and rotational movement thereof.

A ninth aspect of the present invention is a collar member of the eighth aspect of the invention, characterized in that the engagement hole is tapered such that it becomes wider toward the front end of the pipe member.

A tenth aspect of the present invention is a collar member of the eighth aspect of the invention, characterized in that a plurality of the engagement holes are provided, the holes being arranged symmetrically with respect to the axis of the pipe member.

An eleventh aspect of the present invention is a collar member of the eighth aspect of the invention, characterized in that a projecting outer peripheral portion is formed in a part of the planar portion, the outer peripheral portion projecting radially from the outer peripheral surface of the coated fiber holding portion.

A twelfth aspect of the present invention is a collar member of the eleventh aspect of the invention, characterized in that the outer peripheral portion projects from the center of the planar portion toward the extension direction of the engagement hole.

A thirteenth aspect of the present invention is a collar member of the first aspect of the invention, characterized in that an end face to be engaged with the outer periphery of the coated fiber holding portion is formed in the rear half of the pipe member extending in the axial direction thereof.

A fourteenth aspect of the present invention is a collar member of the thirteenth aspect of the invention, characterized in that a hole is formed in the center of the end face.

A fifteenth aspect of the present invention is a collar member of the fourteenth aspect of the invention, characterized in that the hole is elliptical.

A sixteenth aspect of the present invention is a collar member of the fifteenth aspect of the invention, characterized in that the major axis of the elliptical hole coincides with the direction of the key groove.

A seventeenth aspect of the present invention is a collar member of the fourteenth aspect of the invention, characterized in that a pair of concave portions or a pair of convex portions are formed on the inner periphery of the hole such that the concave or convex portions are symmetrical with respect to the axis of the hole.

An eighteenth aspect of the present invention is a ferrule characterized by comprising:

a ferrule tubular body having an optical fiber insertion hole to which an optical fiber is inserted;

a pipe member with an inner diameter that allows the pipe member to fit with the ferrule tubular body;

a collar portion integrally molded on the outer periphery of the pipe member from plastic, the collar portion having on its outer peripheral surface a key groove for positioning with respect to an optical connector housing; and a coated fiber holding portion integrally molded in the rear half of the pipe member from plastic to have an inner diameter smaller than the inner diameter of the pipe member, the coated fiber holding portion receiving therein a coated optical fiber that is obtained by coating the outer periphery of the optical fiber.

A nineteenth aspect of the present invention is a method of manufacturing a collar member, characterized by comprising the steps of:

forming through press molding a pipe member with an inner diameter that allows the pipe member to fit with a ferrule tubular body; and forming through injection molding a collar portion and a coated fiber holding portion on the outer periphery of the pipe member and in the rear half of the pipe member, respectively, the collar portion having on its outer peripheral surface a key groove for positioning with respect to an optical connector housing, the coated fiber holding portion having an inner diameter smaller than the inner diameter of the pipe member, and the coated fiber holding portion receiving therein a coated optical fiber obtained by coating the outer periphery of the optical fiber.

According to the present invention specified as above, the collar member of the ferrule is composed of a pipe member and a collar portion and a coated fiber holding portion which are integrally molded from plastic so as to be integrated with the pipe member. Therefore the dimensional precision can be improved and the manufacturing cost can be reduced.

BRIEF DESCRIPTION OF THE DRAWINGS

FIG. 2A is a sectional view of the ferrule according to Embodiment 1 of the present invention, and FIGS. 2B and 2C are, respectively, a frontal view and a sectional view of a collar member according to Embodiment 1 of the present invention;

FIGS. 3A and 3B are sectional views illustrating a method of molding the collar member according to Embodiment 1 of the present invention;

DETAILED DESCRIPTION OF THE PREFERRED EMBODIMENTS

Details of the present invention will be described through embodiments below.

Embodiment 1

Figure 1:
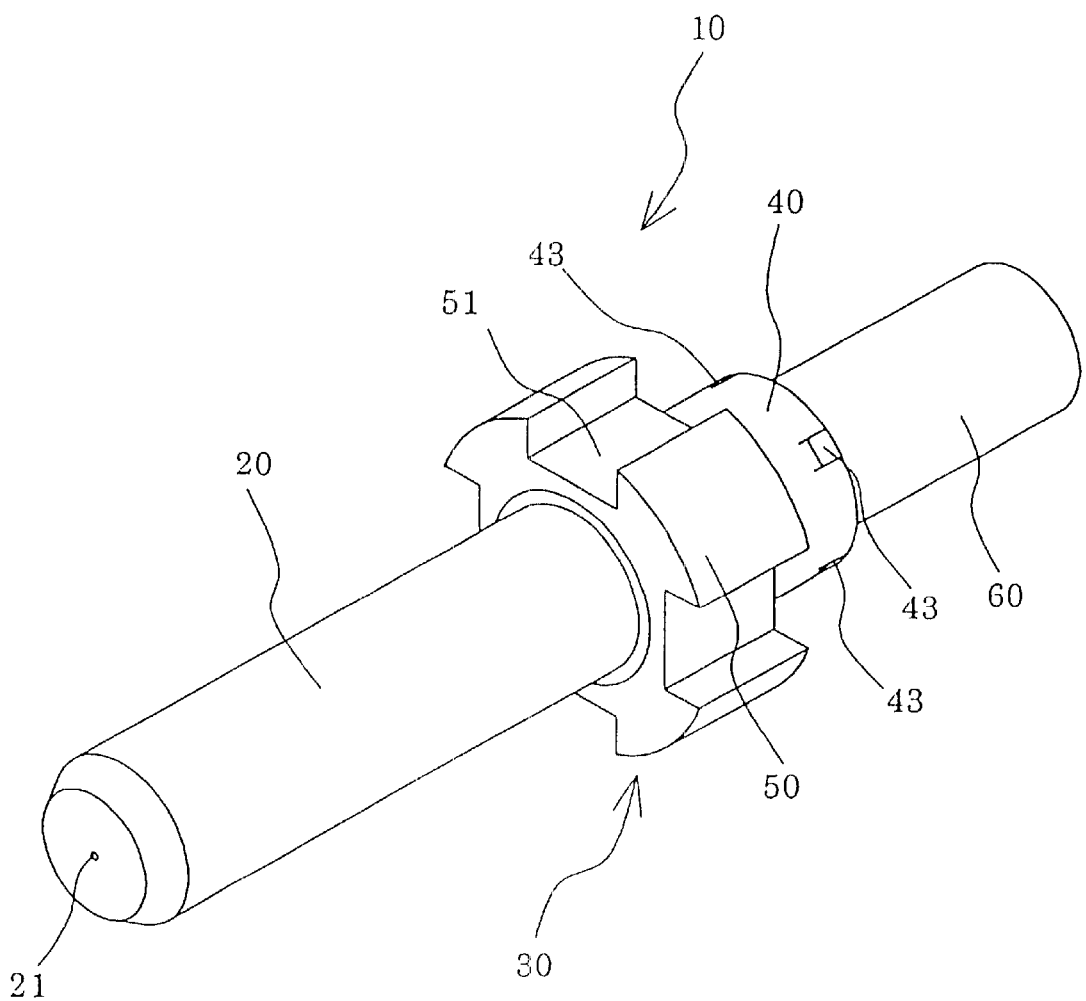
FIG. 1 is a perspective view of a ferrule according to Embodiment 1 of the present invention.

FIG. 1 is a perspective view of a ferrule according to Embodiment 1 of the present invention. FIG. 2A is a sectional view of the ferrule. FIGS. 2B and 2C are a frontal view of a collar member according to Embodiment 1 and a sectional view thereof, respectively.

As shown in the drawings, a ferrule 10 in this embodiment is composed of a ferrule tubular body 20 made of zirconia or other ceramics and a collar member 30 to be fitted with the rear end of the ferrule tubular body 20.

The ferrule tubular body 20 is cylindrical and has therein an optical fiber insertion hole 21 for receiving an optical fiber piercing the ferrule tubular body in the axial direction. The rear end of the optical fiber insertion hole 21 is tapered to form a tapered portion 22 where the inner diameter is gradually increased toward the opening.

The collar member 30 is composed of a pipe member 40, a collar portion 50 and a coated fiber holding portion 60. The pipe member 40 has a tubular portion provided with an inner diameter sufficient to allow the pipe member to accommodate the ferrule tubular body 20 therein, has a through hole 41 piercing it in the axial direction, and is made of a metal such as stainless steel. The collar portion 50 is integrally molded on the outer periphery of the pipe member 40 from plastic. The coated fiber holding portion 60 is integrally molded from plastic in the rear half of the through hole 41 of the pipe member 40.

The collar portion 50 is formed on the front half of the outer peripheral surface of the pipe member 40 along the circumference thereof. The collar portion 50 has on its outer periphery four concave key grooves 51 to be engaged with engagement projections 84 of a plug frame 82 (FIGS. 5A–5C), the details of which will be discussed later.

The coated fiber holding portion 60 has a coated optical fiber insertion hole 61 piercing therethrough in the axial direction to communicate with the optical fiber insertion hole 21 and to receive a coated optical fiber that is obtained by coating the outer periphery of the optical fiber.

The material for the collar portion 50 and the coated fiber holding portion 60 is not particularly limited as long as it is plastic resistant to heat of about 120° C. For example, PBT, PPS, PEI, LCP, PI, PA, etc can be used.

Turning to the outer peripheral surface of the pipe member 40 where the collar portion 50 is formed, there are first projections 42, four in total, projecting outward in the radial direction. The first projections 42 in this embodiment are formed by half-blanking the pipe member 40 and bending it outward in the radial direction. Each of the first projections projects toward the collar portion 50 and buried therein at a position between two adjacent key grooves 51 of the collar portion 50, thereby engaging with the collar portion 50.

The rear half of the pipe member 40 where the coated fiber holding member 60 is formed has second projections 43, four in total, projecting inward in the radial direction. The second projections 43 in this embodiment are formed by slitting the rear end of the pipe member 40 and bending it inward in the radial direction. The second projections are buried in the coated fiber holding portion 60, thereby engaging with the coated fiber holding portion 60.

The first and second projections 42 and 43 of the pipe member 40 are thus buried in the collar portion 50 and the coated fiber holding portion 60, respectively, whereby the collar portion 50 and the coated fiber holding portion 60 are engaged with the pipe member 40. In this way, the axial and rotational movement thereof is restricted.

When the first and second projections 42 and 43 are formed, an opening 42a and a slit 43a are formed in the pipe member 40. The opening 42a and the slit 43a are filled with plastic upon insertion molding of the collar portion 50 and the coated fiber holding portion 60. The relative movement between the two thus can further be restricted.

Now, a detailed description will be given on a molding process in insertion molding of the collar member 30.

Figure 4:
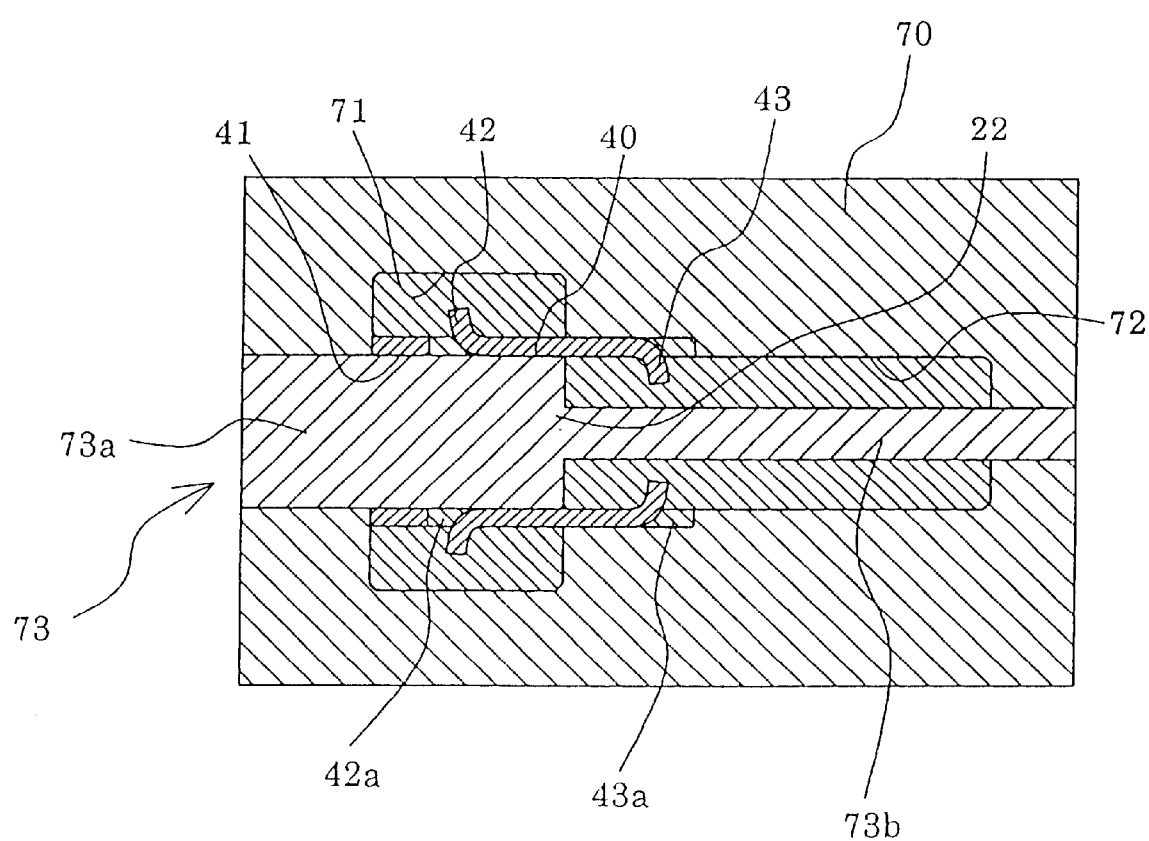
FIG. 4 is a sectional view illustrating the method of molding the collar member according to Embodiment 1 of the present invention.

FIGS. 3A and 3B and FIG. 4 are sectional views showing a process of molding the collar member according to this embodiment.

As shown in FIG. 3A, the pipe member 40 is bent in the radial direction after being half-blanked and slit to form the first and second projections 42 and 43.

Then the pipe member 40 is set in a mold 70 for forming the collar portion 50 and the coated fiber holding portion 60 as shown in FIG. 3B. The mold 70 has concave portions 71 and 72 for molding the collar portion 50 and the coated fiber holding portion 60, and is provided with a core pin 73. The core pin 73 has a large diameter portion 73a to be fitted to the through hole 41 and a small diameter portion 73b for forming the coated fiber holding portion 60.

Next, as shown in FIG. 4, the mold 70 is filled with plastic that is the material of the collar portion 50 and the coated fiber holding portion 60. At this point, the first and second projections 42 and 43 of the pipe member 40 are buried in the plastic while the opening 42a and the slit 43a are filled with the same plastic. After the plastic is hardened, the core pin 73 is removed and the molded product is taken out of the mold 70. Thus obtained is the collar member 30 shown in FIG. 2B in which the collar portion 50 and the coated fiber holding portion 60 are integrated with the pipe member 40.

The pipe member 40 used here has an accurate inner diameter and is relatively inexpensive. The collar member 30 is formed from such an advantageous pipe member 40 by integral molding from plastic of the collar portion 50 and the coated fiber holding portion 60 in which the collar portion 50 is integrated with the outer periphery of the pipe member 40 whereas the coated fiber holding portion 60 is integrated with the rear half of the pipe member 40. In this way, the collar member 30 can be manufactured with low cost and high precision.

Described next are an optical connector plug having the above ferrule 10 and an optical connector adapter with reference to a plan view and sectional views of FIGS. 5A to 5C, which illustrate the plug, and to a perspective view of FIG. 6, which illustrates the adapter.

Figure 5A:
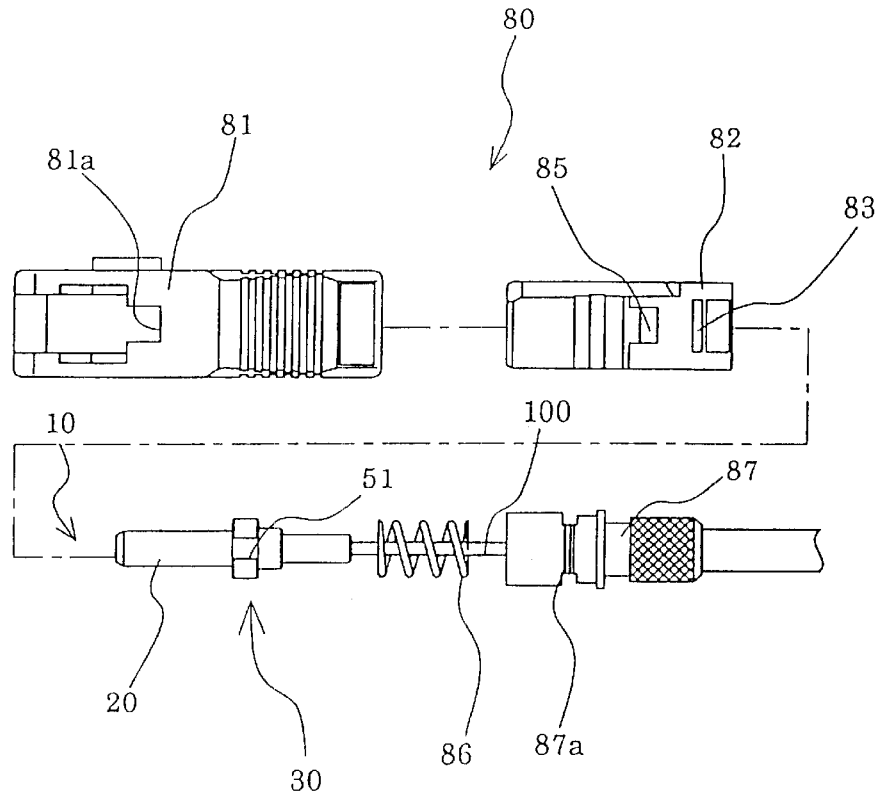
FIG. 5A is a plan view of an optical connector plug according to Embodiment 1 of the present invention.
Figures 5B, 5C:
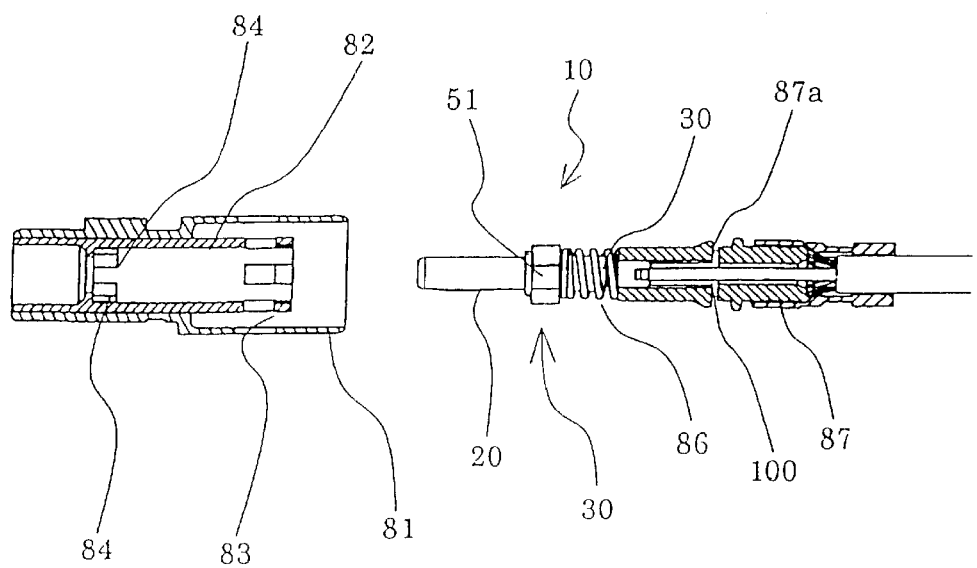
FIGS. 5B and 5C are sectional views thereof.
Figure 6:
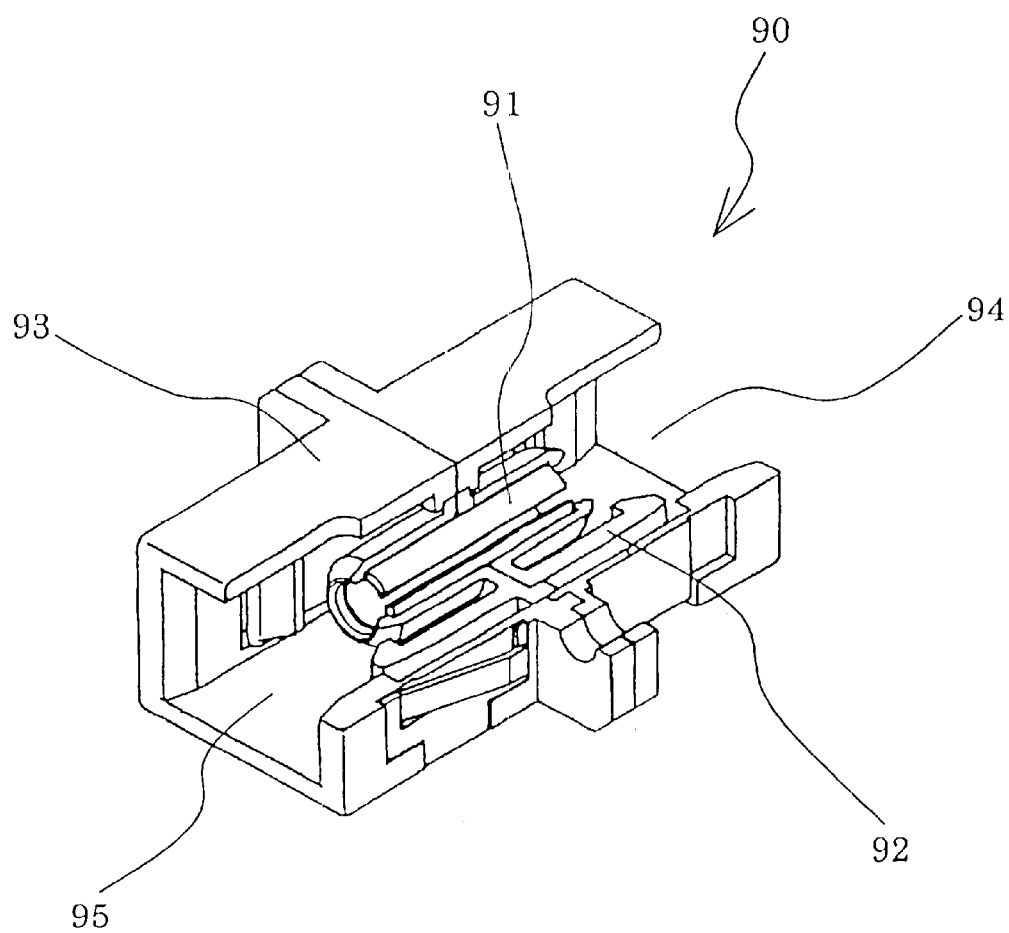
FIG. 6 is a perspective view of an optical connector adapter according to Embodiment 1 of the present invention, with the adapter partially cut away.

The optical connector shown in FIGS. 5A to 6 is an SC type optical connector. The SC type optical connector is composed of an SC type optical connector plug 80 having the above ferrule and an SC type optical connector adapter 90 for contacting the SC type optical connector plug 80 with another SC type optical connector plug 80 face-to-face.

As shown in FIGS. 5A to 5C, the SC type optical connector plug 80 is provided with an SC type plug housing 81 to be fitted to the SC type optical connector adapter 90 and an SC type plug frame 82 to be fitted in the plug housing 81. The plug frame 82 has therein: the above ferrule 10 composed of the ferrule tubular body 20 and the collar member 30; a compression spring 86 to be fitted to the rear half of the outer periphery of the collar member 30; and a stopper 87 to be fitted to the rear end of the collar member 30 through the compression spring 86.

The plug frame 82 successively receives therein the ferrule 10 holding an optical fiber, and the compression spring 86 and the stopper 87 through which a coated optical fiber 100 is inserted in advance. An engagement hook 87a of the stopper 87 is engaged with an engagement hole 83 of the plug frame 82, so that the stopper 87 is fixed to the plug frame 82. The ferrule 10 is held in the plug frame 82 while being axially biased through the compression spring 86. Rotation of the ferrule 10 held in the plug frame 82 is restricted by engagement of the key grooves 51 in the collar member 30 with the two engagement projections 84 formed in the plug frame 82.

The plug frame 82 has on its outer periphery an engagement convex portion 85 to be engaged with the plug housing 81. The engagement convex portion 85 is engaged with an engagement concave portion 81a of the plug housing 81 to thereby hold the plug frame 82 in the plug housing 81.

On the other hand, the optical connector adapter 90 has a built-in optical connection sleeve 91 as shown in FIG. 6. The optical connection sleeve 91 is for optically connecting optical fibers by arranging face-to-face the ferrule 10 holding an optical fiber therein and another ferrule 10 holding an optical fiber therein. The optical connection sleeve 91 is held by a sleeve holder 92 cut in half along the axial direction. The sleeve holder 92 in turn is held by a housing 93 cut in half along the axial direction.

The adapter further has openings 94 and 95. The optical connector plug 80 having the above ferrule is inserted into the adapter from the opening 94 and another optical connector plug 80 having the above ferrule is inserted from the opening 95. The end face of the ferrule 10 of one plug is abutted against the end face of the ferrule 10 of the other plug in the optical connection sleeve 91, thereby establishing optical connection.

Embodiment 2

The collar portion 50 is formed on the outer periphery of the pipe member 40 along the circumference thereof in Embodiment 1. Shown in Embodiment 2 is a case where split collar portion 50A is formed on the outer periphery of the pipe member 40.

Figure 7:
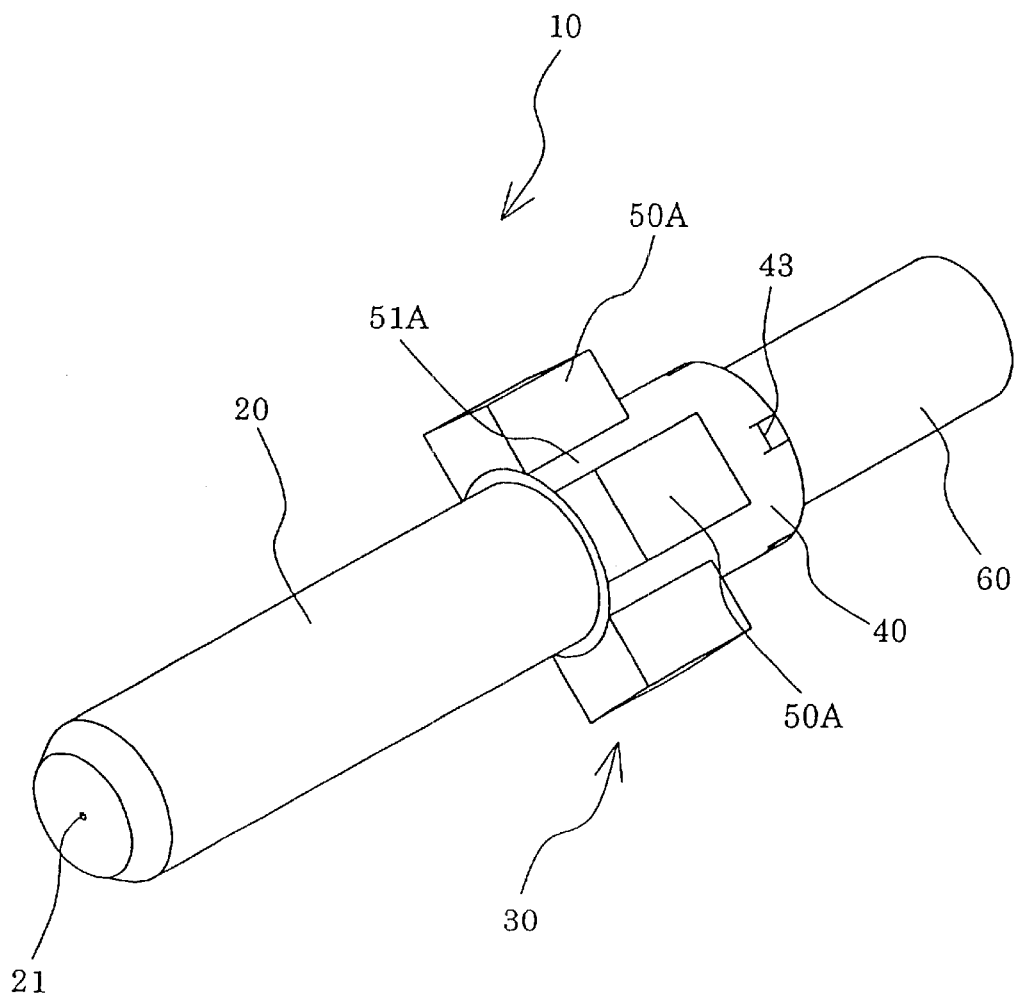
FIG. 7 is a perspective view of a ferrule according to Embodiment 2 of the present invention.
Figures 8A, 8B:
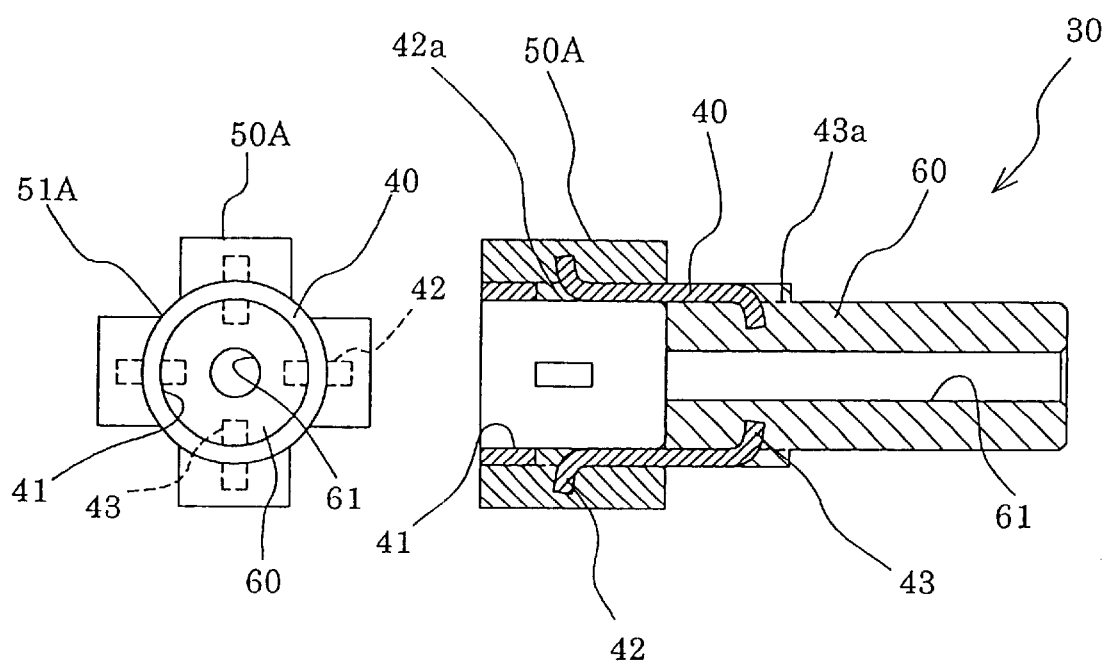
FIGS. 8A and 8B are a frontal view of a collar member according to Embodiment 2 of the present invention and a sectional view thereof, respectively.

FIG. 7 is a perspective view of a ferrule according to Embodiment 2. FIGS. 8A and 8B are a frontal view of a collar member according to Embodiment 2 and a sectional view thereof, respectively. Note that components having the same functions as those described in Embodiment 1 are denoted by the same reference symbols to avoid repeated explanation.

As shown in the drawings, the collar member 30 in this embodiment is composed of the pipe member 40, the collar portion 50A and the coated fiber holding portion 60. The collar portion 50A is comprised of integrally formed four blocks, with the number of blocks corresponding to the number of the first projections 42 of the pipe member 40.

The collar portion 50A is integrally molded from plastic. Therefore, each of the first projections 42 is engaged with one block of the collar portion 50A, so that each of key grooves 51A is defined by two adjacent blocks of the collar portion 50A and the outer peripheral surface of the pipe member 40.

The split collar portion 50A is thus integrally molded on the outer periphery of the pipe member 40 with the number of its blocks corresponding to the number of the first projections 42. Therefore the collar member 30 can be manufactured with low cost and high precision as in the above Embodiment 1.

Embodiment 3

The collar portion 50 and the coated fiber holding portion 60 of the collar member are separately formed in Embodiments 1 and 2 described above. In contrast thereto, Embodiment 3 shows a case where the collar portion 50 and the coated fiber holding portion 60 are integrally formed into one-piece.

Figure 9:
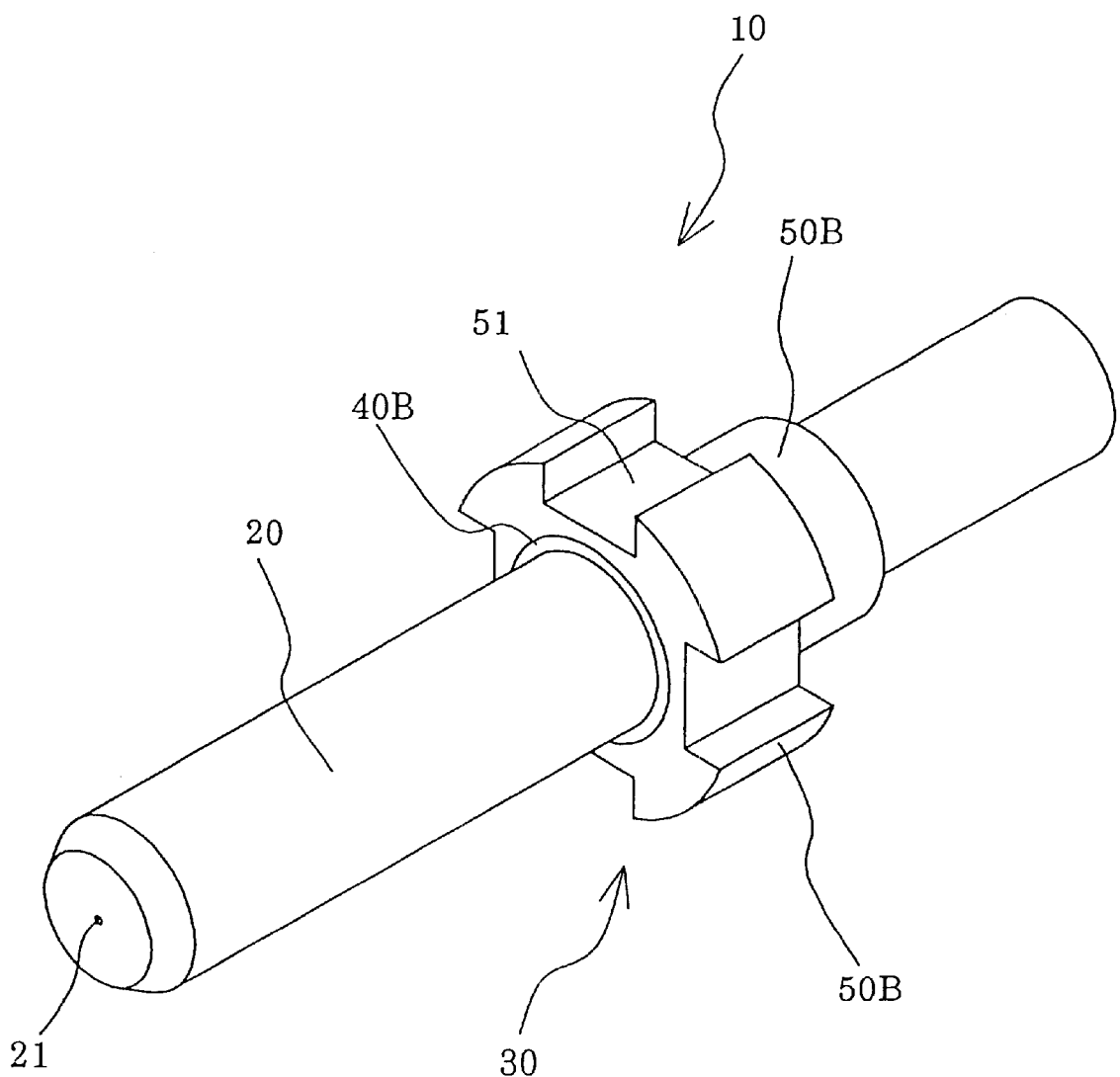
FIG. 9 is a perspective view of a ferrule according to Embodiment 3 of the present invention.
Figure 10:
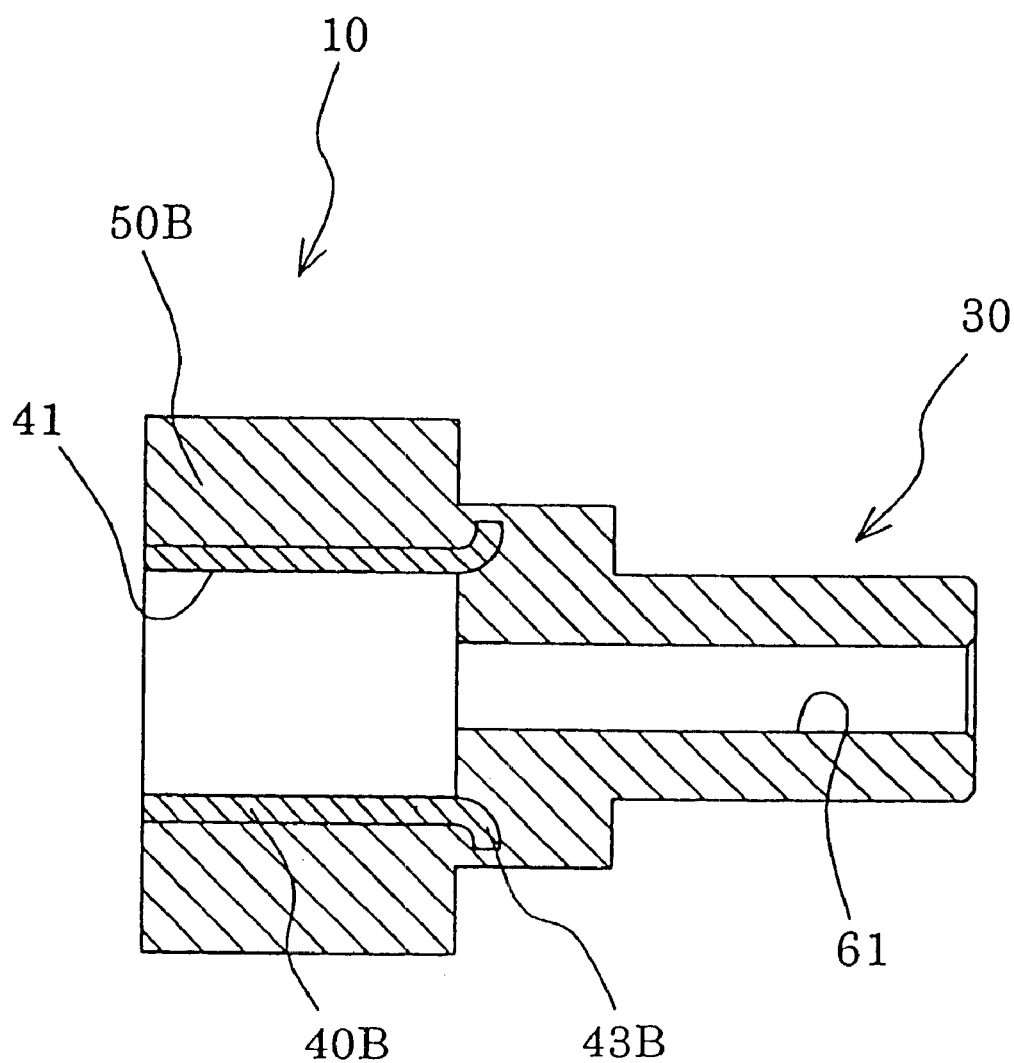
FIG. 10 is a sectional view of a collar member according to Embodiment 3 of the present invention.

FIG. 9 is a perspective view of a ferrule according to Embodiment 3. FIG. 10 is a sectional view of a collar member according to Embodiment 3. Note that components having the same functions as those described in the above embodiments are denoted by the same reference symbols to avoid repeated explanation.

As shown in the drawings, the collar member 30 of the ferrule 10 according to this embodiment is composed of a pipe member 40B and a collar portion 50B integrally molded on the outer periphery of the pipe member 40B from plastic.

The rear end of the pipe member 40B has second projections 43B formed by slitting the pipe member 40B and bending it outward in the radial direction in order to engage with the collar portion 50B.

The collar portion 50B is molded so as to cover the outer periphery of the pipe member 40B. A coated optical fiber insertion hole 61 is formed in the rear half of the collar portion 50B by molding.

The structure as such can further simplify the process of manufacturing the collar member 30. In addition, the axial and rotational movement of the collar portion 50B can be restricted by forming the second projections 43B in the pipe member 40B. The second projections 43B engaging with the collar portion 50B is formed in this embodiment in the pipe member 40B so as to project outward in the radial direction of the pipe member 40B. However, the configuration of the second projections is not limited thereto. The second projections 43B may be second projections 43 projecting inward in the radial direction as in the above Embodiments 1 and 2. Also, the second projections 43B may be provided together with the first projections 42.

Embodiment 4

The pipe member 40B is engaged with the collar portion 50B by means of the second projections 43B in Embodiment 3. Shown in Embodiment 4 is a case in which grooves engaging with the collar portion are formed on the outer periphery of the pipe member to thereby restrict the axial and rotational movement of the collar portion.

Figure 11:
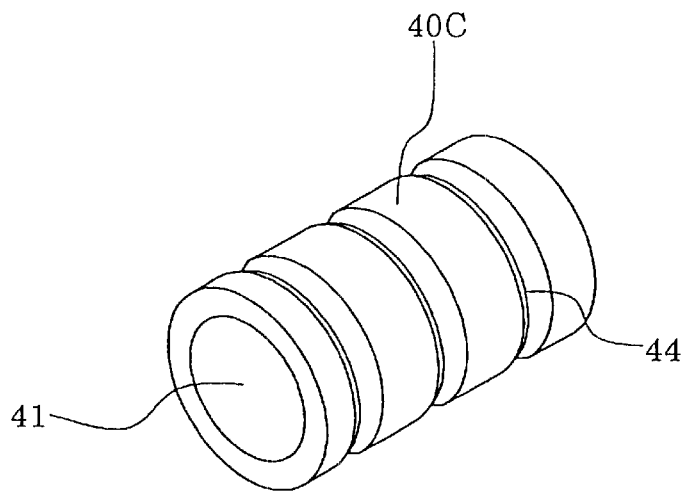
FIG. 11 is a perspective view of a pipe member according to Embodiment 4 of the present invention.
Figure 12:
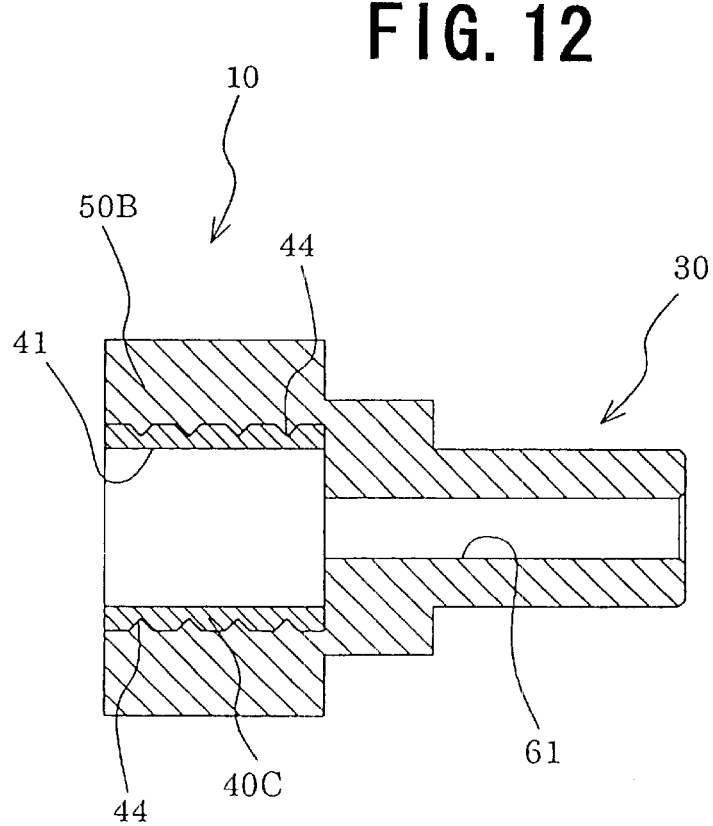
FIG. 12 is a sectional view of a collar member according to Embodiment 4 of the present invention.

FIG. 11 is a perspective view of a pipe member according to Embodiment 4. FIG. 12 is a sectional view of a collar member according to Embodiment 4. Note that components having the same functions as those described in the above embodiments are denoted by the same reference symbols to avoid repeated explanation.

As shown in the drawings, a pipe member 40C of this embodiment has on its outer periphery a plurality of engagement grooves 44 that are shaped into V in section and are formed along the circumference of the pipe member 40C.

The collar portion 50B is integrally molded on the outer periphery of the pipe member 40C from plastic. Since the collar portion 50B is molded along the engagement grooves 44, its axial and rotational movement can be restricted. This structure also can provide the same effect as the above embodiments.

Embodiment 5

In Embodiment 4, a plurality of engagement grooves 44 engaging with the collar portion 50B are formed on the outer periphery of the pipe member 40C to thereby restrict the axial and rotational movement of the collar portion 50B. The plural engagement grooves of the pipe member are replaced by a helical groove in Embodiment 5.

Figure 13:
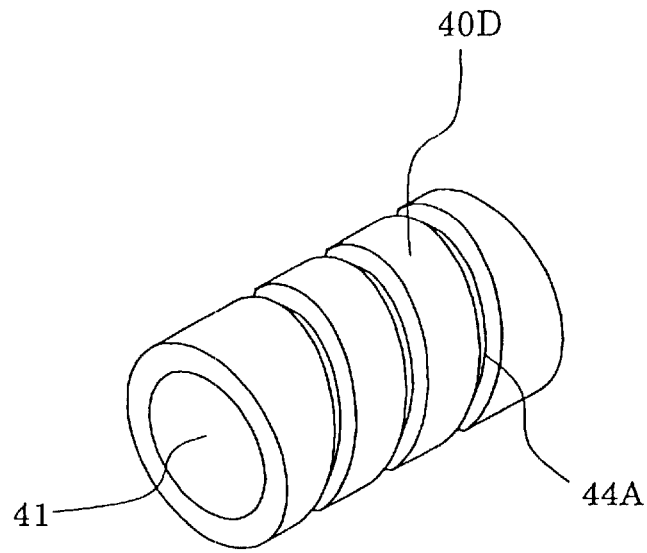
FIG. 13 is a perspective view of a pipe member according to Embodiment 5 of the present invention.
Figure 14:
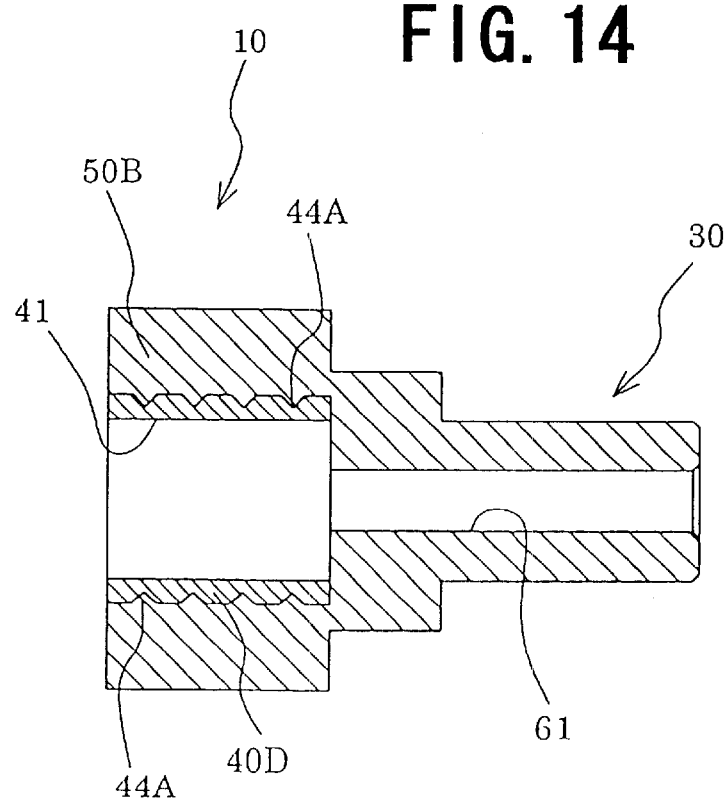
FIG. 14 is a sectional view of a collar member according to Embodiment 5 of the present invention.

FIG. 13 is a perspective view of a pipe member according to Embodiment 5. FIG. 14 is a sectional view of a collar member according to Embodiment 5. Note that components having the same functions as those described in the above embodiments are denoted by the same reference symbols to avoid repeated explanation.

As shown in the drawings, a pipe member 40D according to Embodiment 5 has on its outer periphery an uninterrupted helical engagement groove 44A. The engagement groove 44A engages with the collar portion 50B to thereby restrict the axial and rotational movement of the collar portion 50B.

This structure also can provide the same effect as the above embodiments.

Embodiment 6

The engagement grooves 44 engaging with the collar portion 50B are formed on the outer periphery of the pipe member 40C in Embodiment 4. The engagement groove 44A engaging with the collar portion 50B is formed on the outer periphery of the pipe member 40D in Embodiment 5. In Embodiment 6, engagement holes communicated with the through hole are formed in a side face of the pipe member, and the engagement holes are engaged with the collar portion to thereby restrict the axial and rotational movement of the collar portion.

Figure 15:
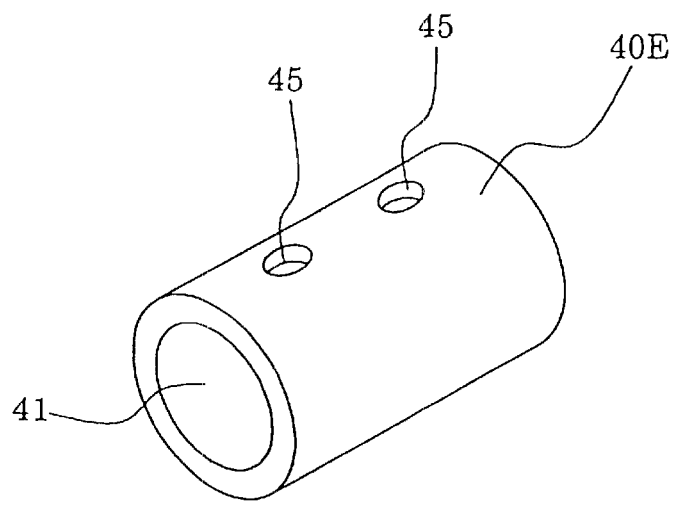
FIG. 15 is a perspective view of a pipe member according to Embodiment 6 of the present invention.
Figure 16:
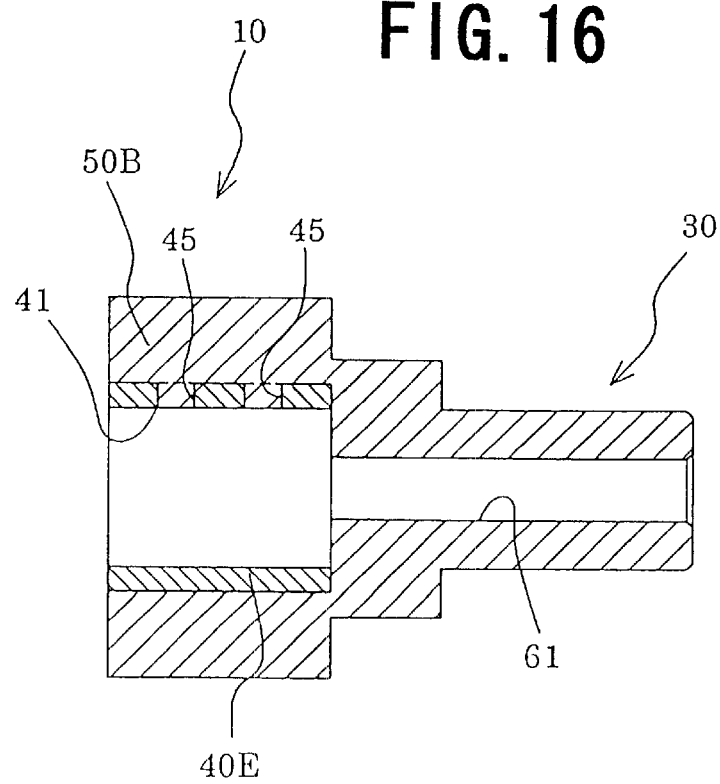
FIG. 16 is a sectional view of a collar member according to Embodiment 6 of the present invention.

FIG. 15 is a perspective view of a pipe member according to Embodiment 6. FIG. 16 is a sectional view of a collar member according to Embodiment6. Note that components having the same functions as those described in the above embodiments are denoted by the same reference symbols to avoid repeated explanation.

As shown in the drawings, a pipe member 40E of this embodiment has two engagement holes 45 opened and arranged side by side in the axial direction on the outer periphery of the pipe member 40E to be communicated with the through hole 41.

The engagement holes 45 are filled with plastic for forming the collar portion 50B upon integrally molding the collar portion SOB on the outer periphery of the pipe member 40E. The collar portion 50B is engaged with the engagement holes 45 so as to be restricted in its axial and rotational movement.

The collar member 30 structured as such also can provide the same effect as the above Embodiment 4.

Embodiment 7

Figure 17:
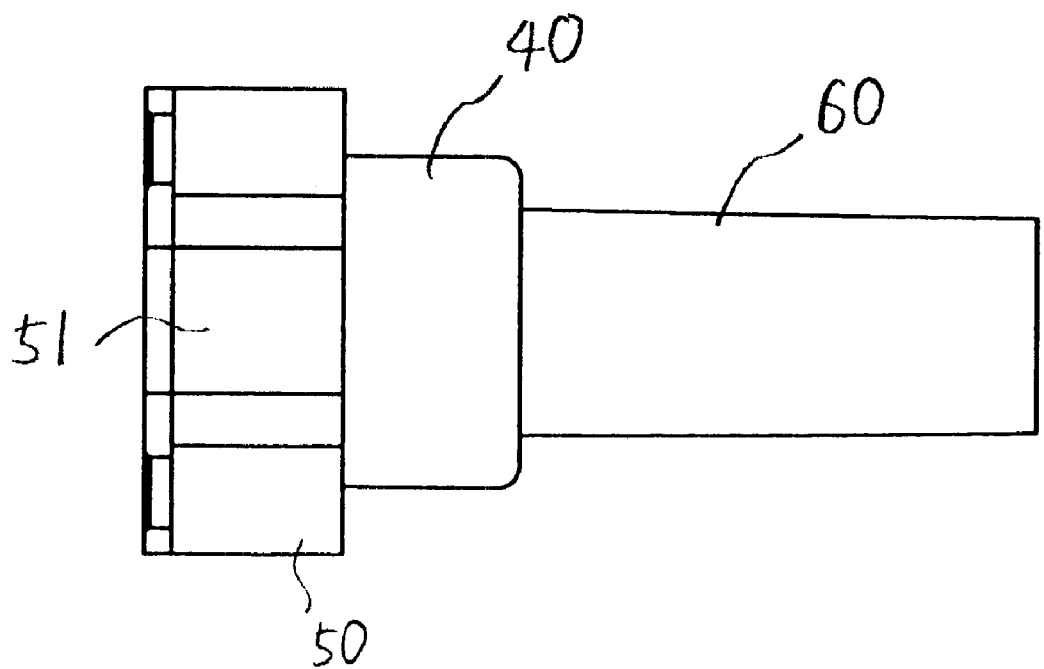
FIG. 17 is a frontal view of a collar member according to Embodiment 7 of the present invention.

FIG. 17 is a frontal view of a collar member according to Embodiment 7 of the present invention. The collar member is composed of a pipe member 40, a collar portion 50 and a coated fiber holding portion 60. The pipe member 40 is formed through press molding of a metal. The collar portion 50 is integrally molded on the front half of the outer periphery of the pipe member from plastic, and has positioning key grooves 51. The coated fiber holding portion 60 is formed in the rear half of the pipe member.

Figure 18:
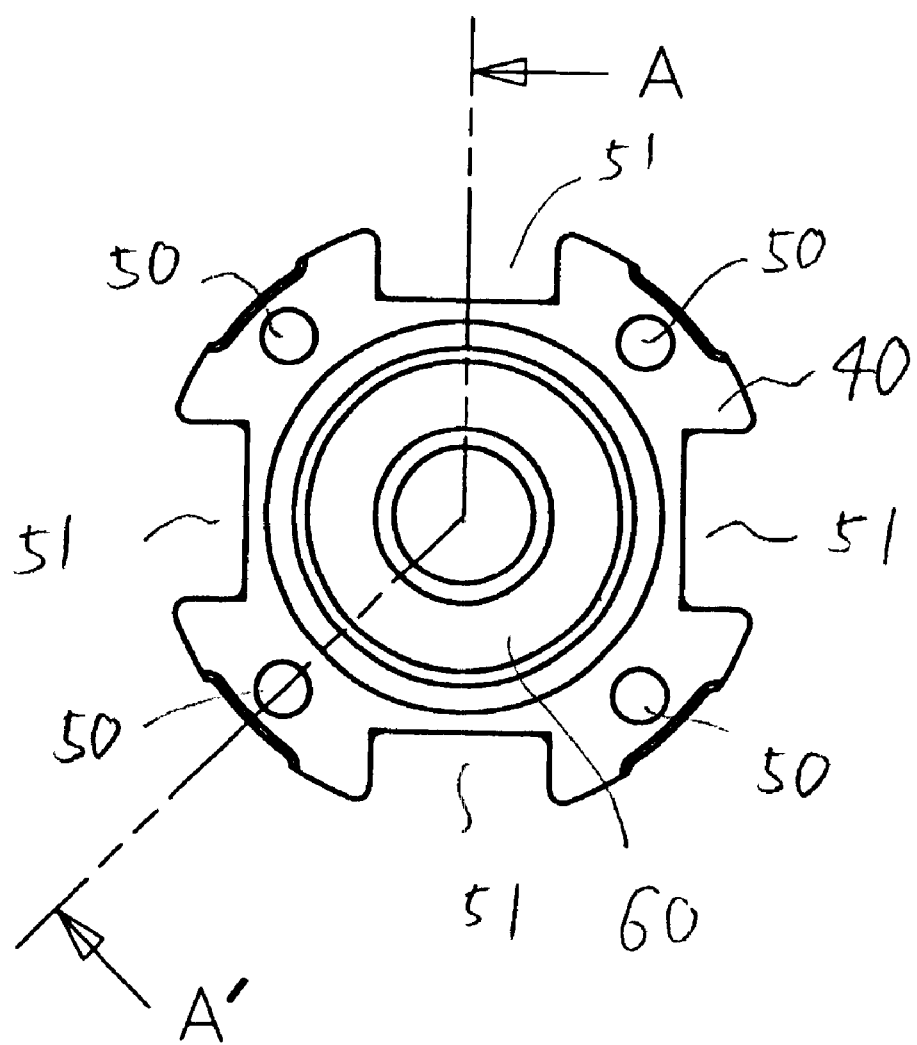
FIG. 18 is a side view of the collar member according to Embodiment 7 of the present invention.

FIG. 18 is a side view of the collar member in FIG. 17, showing the front end thereof. There are four key grooves 51 in a planar portion on the bottom of the cylinder of the pipe member 40. On the planar portion of the pipe member 40, between every two adjacent key grooves, the collar portion 50 integrated with the pipe member 40 is exposed.

Figure 19:
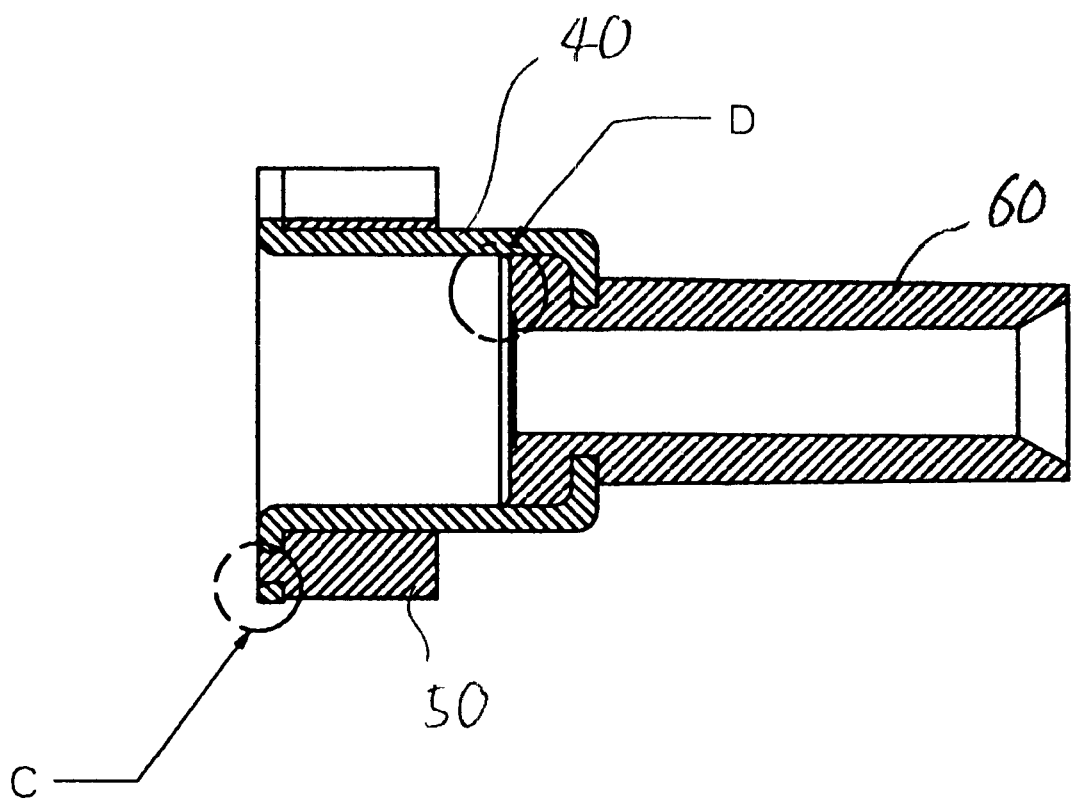
FIG. 19 is a sectional view of the collar member according to Embodiment 7 of the present invention.

FIG. 19 is a sectional view of the collar member, taken along the line A–A' running through the center in FIG. 18.

Figure 20:
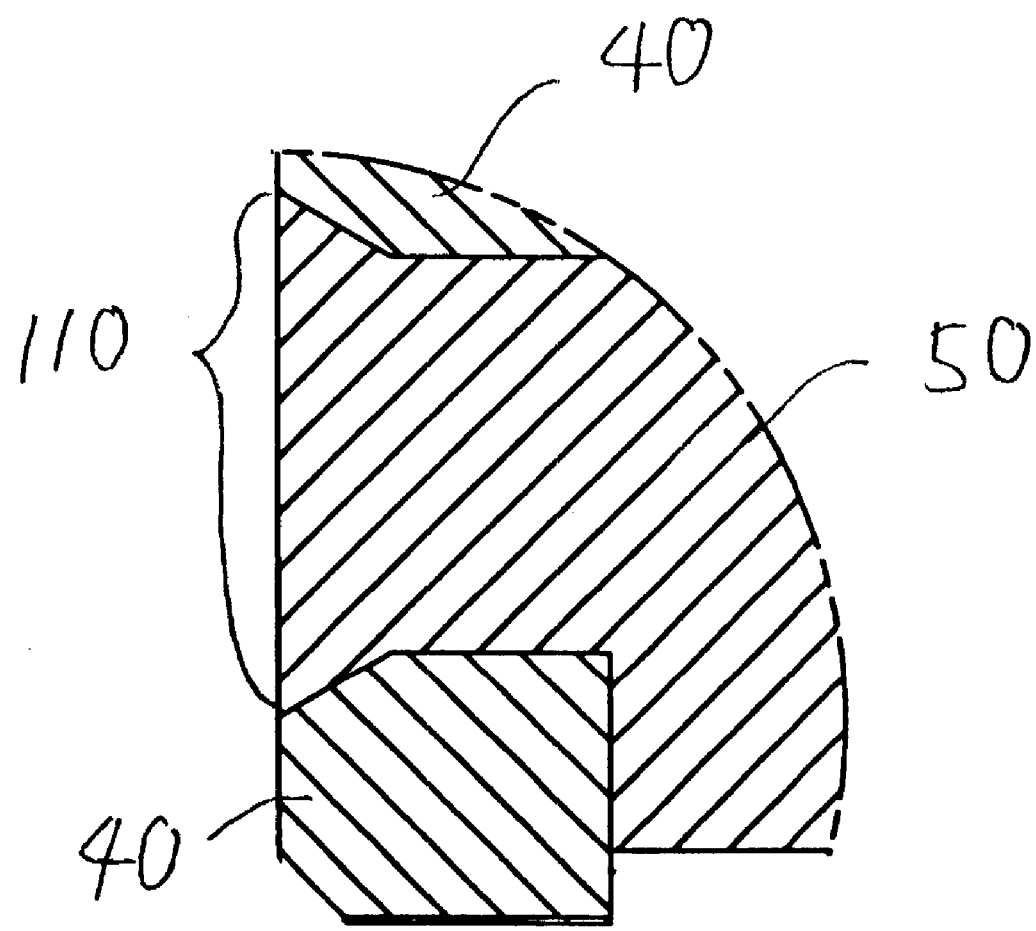
FIG. 20 is another sectional view of the collar member according to Embodiment 7 of the present invention.

FIG. 20 shows in section an enlarged view of a portion C in FIG. 19. A tapered engagement hole 110 whose diameter is increased toward the planar portion on the front end of the pipe member 40 can be seen in FIG. 20. Being tapered, the engagement hole 110 can prevent the collar portion from moving in the axial direction of the pipe member 40.

Figure 21:
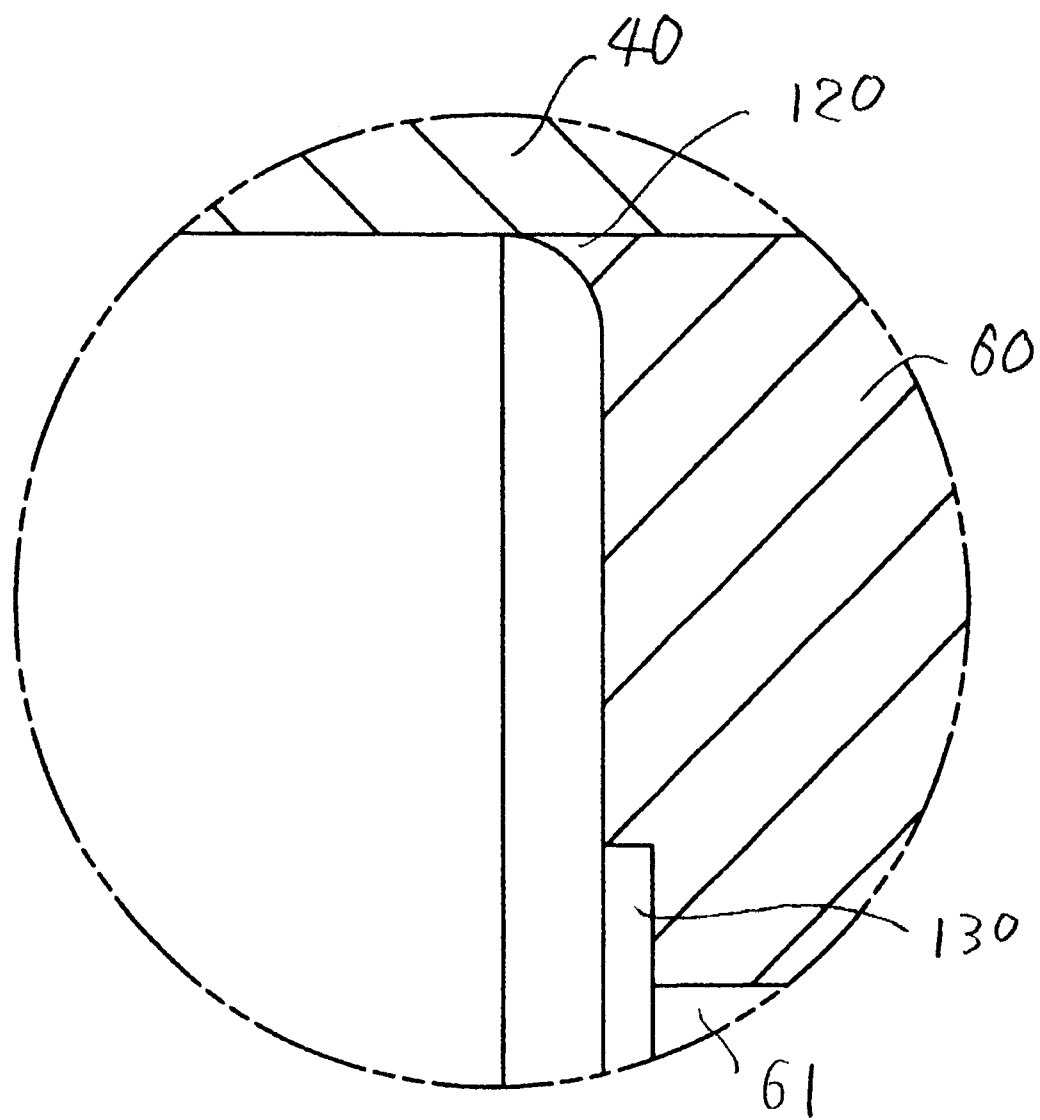
FIG. 21 is still another sectional view of the collar member according to Embodiment 7 of the present invention.

FIG. 21 shows in section an enlarged view of a portion D in FIG. 19. A portion denoted by 120 is formed on the outer periphery on the front end of the coated fiber holding portion 60 and corresponds to R of the mold, which is to facilitate the movement of the mold in injection molding. A stepped portion 130 is further formed in order to lead out flash taking place at the edge of the coated optical fiber insertion hole 61.

Figure 22:
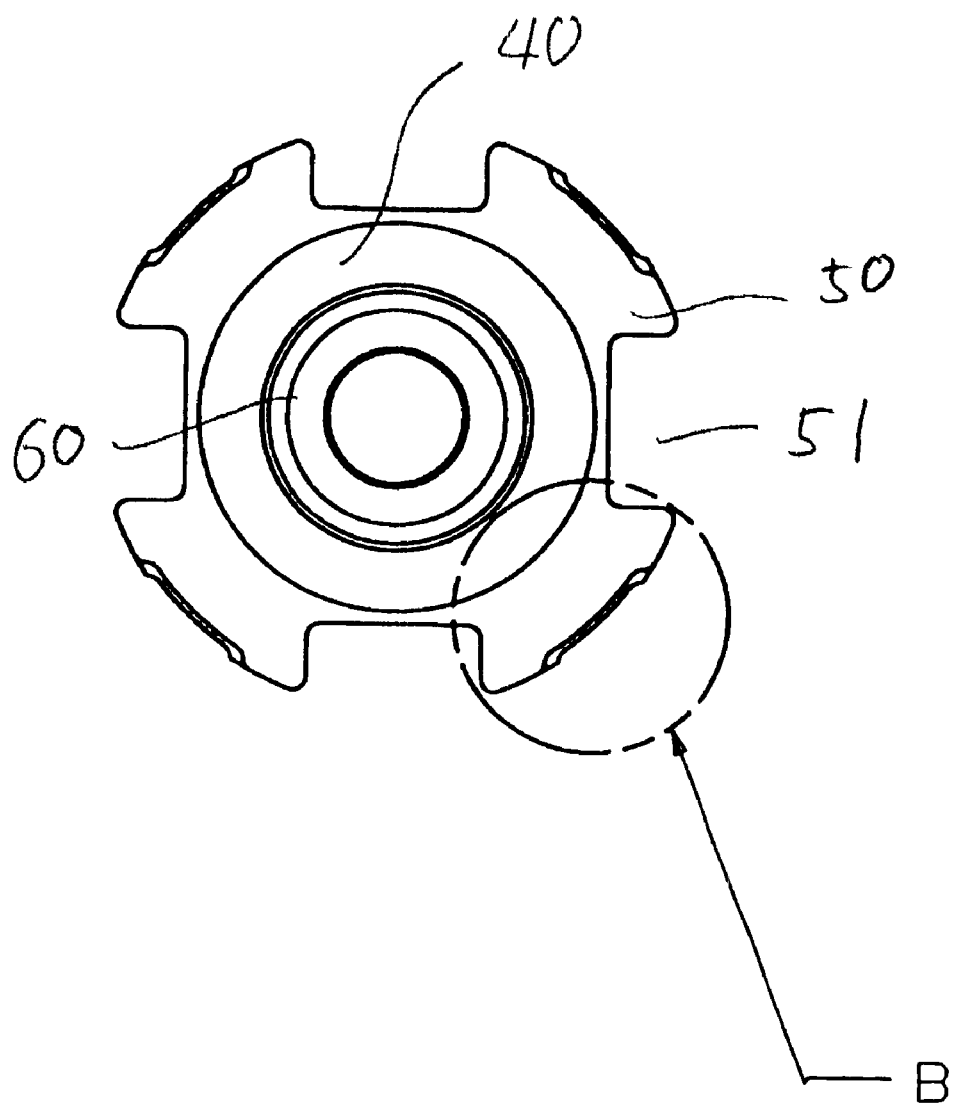
FIG. 22 is another side view of the collar member according to Embodiment 7 of the present invention.

FIG. 22 is a side view of the collar member in FIG. 17, showing the rear end thereof. The pipe member 40 and the coated fiber holding portion 60 are formed in the inner periphery of the collar portion 50 having the key grooves 51.

Figure 23:
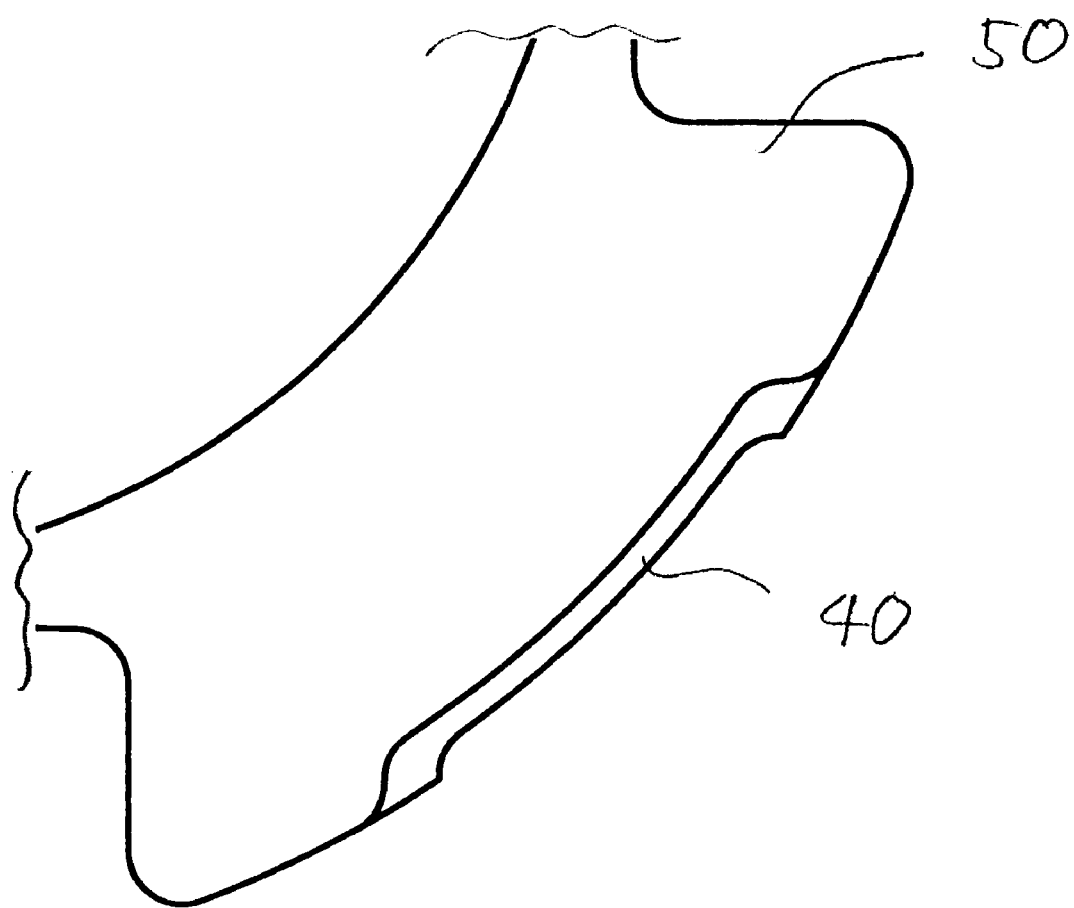
FIG. 23 is still another side view of the collar member according to Embodiment 7 of the present invention.

FIG. 23 is a side view of the collar member, in which a portion B of FIG. 22 is enlarged. At some points along the outer periphery of the collar portion 50, a part of the pipe member 40 peeks out in the radial direction.

Other Embodiments

Preferred embodiments of the present invention thus have been described. However, the basic structure of the collar member 30 and the ferrule 10 is not limited to those shown in the above.

For instance, the basic structure is not limited to Embodiment 1 where the pipe member 40 is provided with the first and second projections 42 and 43. The pipe member may have instead a combination of the second projections and the engagement grooves of Embodiment 4 formed on the outer periphery of the pipe member. The same effect as the embodiments above can be obtained also when the projections, engagement grooves and engagement holes are thus used in combination.

Also, the optical connector to which the ferrule 10 of the present invention is mounted is not limited to the SC type optical connector of Embodiment 1. Needless to say, the present invention can be applied to other optical connectors such as an FC type optical connector.

As has been described, according to the present invention, the collar member is composed of a pipe member, a collar portion integrally molded on the outer periphery of the pipe member from plastic, and a coated fiber holding portion integrally molded in the rear half of the pipe member from plastic. Therefore the collar member and the ferrule of the present invention can be manufactured with improved dimensional precision and reduced manufacturing cost.

What is claimed is:

1. A collar member for mounting at the rear end of a ferrule tubular body that has an optical fiber insertion hole into which a coated optical fiber is inserted, the collar member comprising:

a pipe member formed of metal and having a tubular portion with an inner diameter sufficient to slidably accommodate therein the ferrule tubular body;

a collar portion integrally molded of plastic on the outer periphery of a front portion of the pipe member, the collar portion having on an outer peripheral surface thereof a key groove for positioning with respect to an optical connector housing; and a coated fiber holding portion integrally molded of plastic in a rear portion of the pipe member to have an inner diameter smaller than the inner diameter of the tubular portion of the pipe member, the coated fiber holding portion having a through-hole extending therethrough for receiving a coated optical fiber.

2. A collar member according to claim 1; wherein the collar portion and the coated fiber holding portion are integrally formed in a one-piece construction.

3. A collar member according to claim 1; wherein the collar portion and the coated fiber holding portion are engaged with the pipe member so that they are restricted in axial and rotational movement.

4. A collar member according to claim 1; wherein the pipe member has projections extending from its outer peripheral surface where the collar portion is formed or on its inner peripheral surface where the coated fiber holding portion is formed to restrict the collar portion or the coated fiber holding portion from axial and rotational movement with respect to the pipe member.

5. A collar member according to claim 1; wherein the pipe member has on its outer peripheral surface a plurality of grooves formed along the circumference thereof, and the plastic forming at least one of the collar portion and the coated fiber holding portion extends into the grooves to prevent axial and rotational movement of the collar portion or the coated fiber holding portion with respect to the pipe member.

6. A collar member according to claim 1; wherein the pipe member has on its outer peripheral surface a helical groove, and the plastic forming at least one of the collar portion and the coated fiber holding portion extends into the helical groove to prevent axial and rotational movement of the collar portion and the coated fiber holding portion with respect to the pipe member.

7. A collar member according to claim 1; wherein the pipe member has one or more engagement holes formed in its outer peripheral surface, and the plastic forming at least one of the collar portion and the coated fiber holding portion extends into the engagement holes to prevent axial and rotational movement of the collar portion and the coated fiber holding portion with respect to the pipe member.

8. A collar member according to claim 1; wherein the pipe member has a planar portion at the front portion where the collar portion is formed, the planar portion comprising an extension portion of the pipe member spreading radially outward from the tubular portion thereof, the planar portion having one or more engagement holes engaged with an outer peripheral surface of the collar portion.

9. A collar member according to claim 8; wherein the one or more engagement holes are tapered such that they become wider toward the front portion of the pipe member.

10. A collar member according to claim 8; wherein the one or more engagement holes are placed such that they are symmetrical with respect to the longitudinal axis of the tubular portion of the pipe member.

11. A collar member according to claim 8; wherein a projecting outer peripheral portion is formed in the planar portion, the outer peripheral portion projecting radially from the outer peripheral surface of the coated fiber holding portion.

12. A collar member according to claim 11; wherein the outer peripheral portion projects from the center of the planar portion toward the extension direction of the engagement hole.

13. A collar member according to claim 1; wherein the pipe member has an end face engaged with the outer periphery of the coated fiber holding portion, the end face being formed in the rear portion of the pipe member extending in the axial direction thereof.

14. A collar member according to claim 13; wherein a hole is formed in the center of the end face.

15. A collar member according to claim 14; wherein the hole is elliptical.

16. A collar member according to claim 15; wherein the major axis of the elliptical hole coincides with the direction of the key groove.

17. A collar member according to claim 14; wherein a pair of concave portions or a pair of convex portions are formed in the inner periphery of the hole such that the concave or convex portions are symmetrical with respect to the major axis of the hole.

18. A collar member according to claim 1; wherein the pipe member is formed by press molding a metal; and the collar portion and the coated fiber holding portion are formed by injection molding.

19. A collar member according to claim 1; wherein the pipe member has radially extending projections provided in an outer peripheral surface thereof and extending into the collar portion so as to restrict the collar portion from axial and rotational movement with respect to the pipe member.

20. A collar member according to claim 1; wherein the pipe member has radially extending projections provided in an inner peripheral surface thereof extending into the coated fiber holding portion so as to restrict the coated fiber holding portion from axial and rotational movement with respect to the pipe member.

21. A collar member for an optical connector ferrule, comprising: a metal tubular member; a plastic collar portion injection molded to an outer surface of the metal tubular member; and a plastic tubular fiber holder injection molded to the metal tubular member.

22. A collar member according to claim 21; wherein the metal tubular member has an inner diameter sufficient to slidably accommodate a ferrule tubular body therein.

23. A collar member according to claim 21; wherein the plastic collar portion is molded at a front portion of the metal tubular member.

24. A collar member according to claim 23; wherein the plastic collar portion has on an outer peripheral surface thereof a key groove for positioning with respect to an optical connector housing.

25. A collar member according to claim 21; wherein the plastic collar portion is molded to a front portion of the metal tubular member, the plastic tubular fiber holder is molded to a rear portion of the metal tubular member and has a portion extending into the metal tubular member.

26. A collar member according to claim 21; wherein the plastic collar portion and the plastic tubular fiber holder are integrally formed in a one-piece construction.

27. A collar member according to claim 21; wherein the plastic collar portion and plastic tubular fiber holder are engaged with the metal tubular member so that they are restricted in axial and rotational movement.

28. A collar member according to claim 21; wherein the metal tubular member has one or more radially extending projections provided in the outer peripheral surface thereof extending into the plastic collar portion so as to restrict the plastic collar portion from axial and rotational movement with respect to the metal tubular member.

29. A collar member according to claim 21; wherein the metal tubular member has radially extending projections provided in an inner peripheral surface thereof extending into the plastic tubular fiber holder so as to restrict the plastic tubular fiber holder from axial and rotational movement with respect to the metal tubular member.

30. A collar member according to claim 21; wherein the metal tubular member has one or more grooves on an outer peripheral surface thereof, and the plastic forming at least one of the collar portion and the tubular fiber holder extends into the grooves to prevent axial and rotational movement of the collar portion and the tubular fiber holder with respect to the metal tubular member.

31. A collar member according to claim 21; wherein the metal tubular member has one or more engagement holes formed therein, and the plastic forming at least one of the collar portion and the tubular fiber holder extends into the engagement holes to prevent axial and rotational movement of the collar portion and the tubular fiber holder with respect to the metal tubular member.

* * * * *